July 6, 1965   F. G. DANHIER   3,193,661
WELDING ROD AND ELECTRODE
Filed Oct. 29, 1962
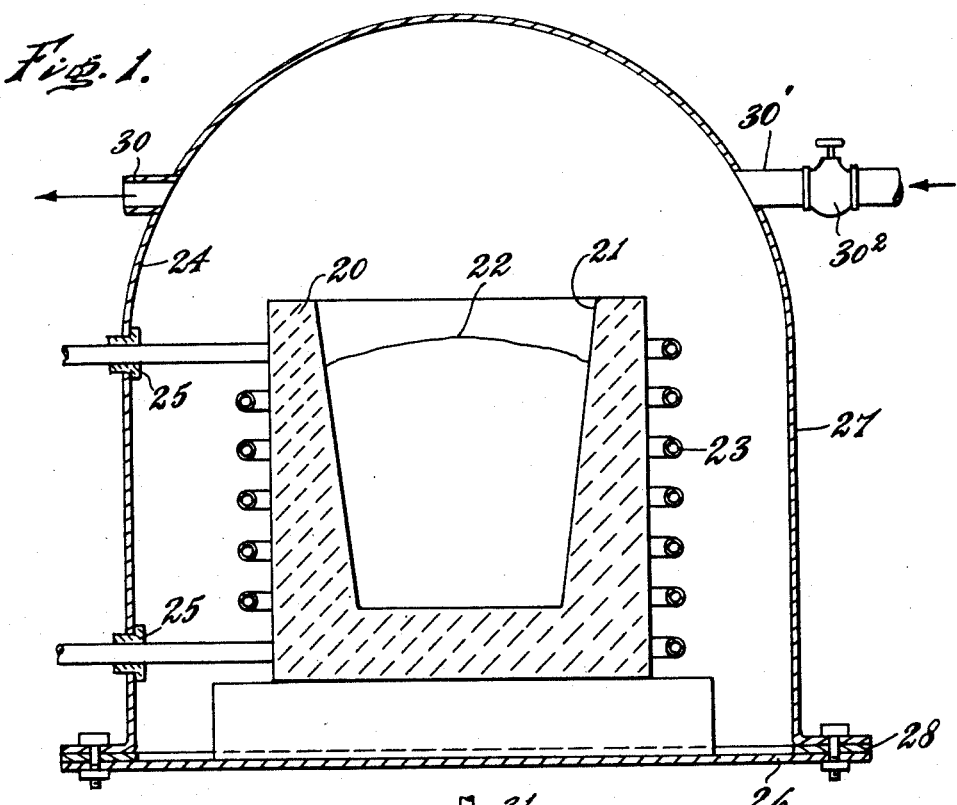
Fig. 1.
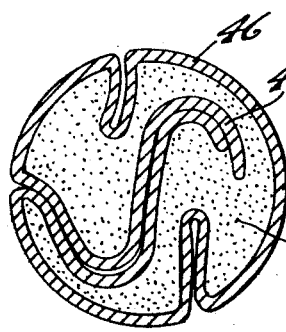
Fig. 3.
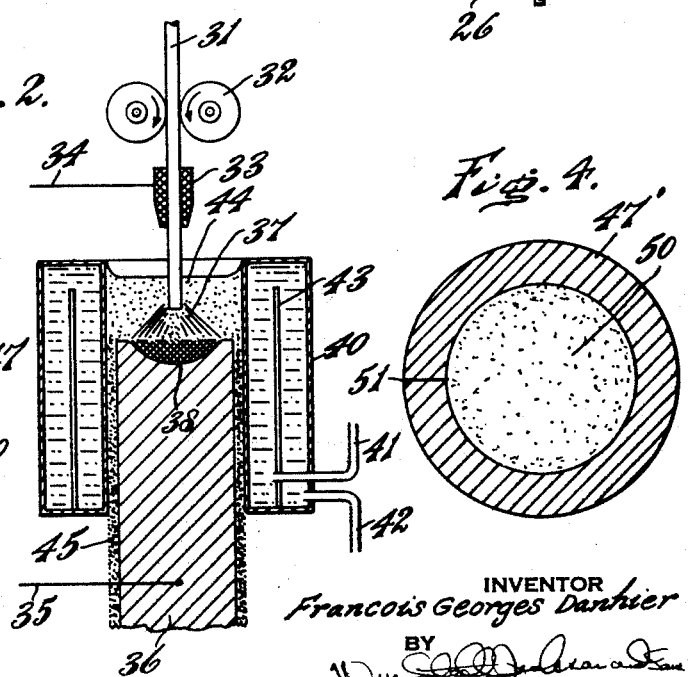
Fig. 2.
Fig. 4.
INVENTOR
Francois Georges Danhier
BY
ATTORNEYS

United States Patent Office 3,193,661
Patented July 6, 1965

3,193,661
WELDING ROD AND ELECTRODE
Francois Georges Danhier, Uccle, Brussels, Belgium, assignor to La Soudure Electrique Autogene, S.A., Brussels, Belgium, a corporation of Belgium
Original application Apr. 26, 1961, Ser. No. 105,719. Divided and this application Oct. 29, 1962, Ser. No. 233,823
7 Claims. (Cl. 219—146)

The present invention relates to welding rods including cored electrodes with a sheath of ductile alloy high in cobalt.

The present application is a divisional of my copending application Serial No. 105,719, filed April 26, 1961, for Method of Producing Alloy, now abandoned.

A purpose of the invention is to produce alloys high in cobalt in the form of ductile hot and cold worked welding rods and electrodes.

A further purpose is to produce a ductile high cobalt strip.

A further purpose is to produce a continuous welding rod suitably an electrode of high cobalt alloy, which can conveniently be coiled.

A further purpose is to produce improved hard facings which are both hot hard and resistant to oxidation.

A further purpose is to apply hot facings by automatic welding techniques.

A further purpose is to lower the cost of hard facing.

A further purpose is to render cobalt ductile by alloying with 2 to 10% and preferably about 5% of iron, and desirably also with 0 to 3%, preferably 0.5 to 3% and most desirably about 2% of manganese, and desirably also with 0 to 0.1%, preferably 0.01 to 0.1% magnesium, and desirably also with 0 to 12%, preferably 0.5 to 8% and most desirably about 2% of nickel for the purpose of assuring most favorable ductility in the cobalt.

A further purpose is to include from 0 to 0.8%, and most desirably 0.05 to 0.8% of titanium, suitably replacing half of the magnesium by titanium.

A further purpose is to maintain the carbon content of the cobalt strip below 0.1% and preferably below 0.06%.

Further purposes appear in the specification and in the claims.

In the drawings I have chosen to illustrate two alternate apparatuses of the character which may be employed in making the welding rod or electrode of the invention, and two alternate forms of welding rod or electrode according to the invention.

FIGURE 1 is a central vertical diagrammatic section of an electric induction furnace shielded from the atmosphere and adapted to be employed in making the welding rod or electrode of the invention.

FIGURE 2 is a diagrammatic central vertical section of an electric Joule effect deposition mechanism adapted to be employed in making the welding rod or electrode of the invention.

FIGURE 3 is an enlarged cross section of one form of welding rod or electrode in accordance with the invention.

FIGURE 4 is an enlarged cross section of another form of welding rod or electrode according to the invention.

Describing in illustration but not in limitation and referring to the drawings:

While it is stated in the Metals Handbook (1948) at page 1137, that cobalt is suitable for forming by hot or cold working and can be drawn into fine wire, the difficulties in doing this are so great that so far as I am aware no ductile cobalt is available on the market.

The usual source of cobalt is a granular material obtained from Katanga which has been thermally refined and is of high purity. The purity of cobalt plus nickel is about 99.6% and the nickel content is normally about 1%. There is a sulphur content of about 0.002% and the cobalt contains traces of other impurities such as arsenic, carbon and copper. This granular material, although it is of such high purity, is extremely brittle and under impact it pulverizes even at red heat.

One of the important objectives of the present invention is to make it possible to produce ductile cobalt or alloys high in cobalt in wrought form, for example in the form of strip, sheet or wire, using techniques of hot working suitably followed by cold working.

The production of such ductile wrought high cobalt materials is particularly helpful in welding of alloys high in cobalt and especially in hard facing or overlaying of high cobalt alloys. When present sources of high cobalt welding rods or electrodes are used, for example for producing hard facings, the rods or electrodes must be cast and are so lacking in ductility that they cannot be appreciably bent without breaking. Therefore such rods or electrodes are not applicable to automatic welding machines, which are normally equipped to use rods or electrodes in coiled form. The present invention however makes it possible to produce ductile high cobalt rods or electrodes which can be coiled and can be used in welding, hard facing or overlaying as for example by the submerged arc or the gas shielded process. Thus continuous electrodes of high cobalt alloys are made possible.

One great advantage of the invention is that the cost of producing high cobalt hard facing electrodes and rods is greatly reduced.

The invention also lends itself to the production of hard facings which are hot hard and resistant to oxidation.

In the prior art cobalt has been so hot short that hot working of cobalt has been very difficult. The exact reason for this difficulty has not been fully known by prior art workers. An extensive investigation of hot and cold working of cobalt and means of producing ductile high cobalt alloys by the present inventor indicates that there are several factors which contribute to the difficulty of hot working cobalt in the prior art. One problem is the presence of oxygen as an impurity. Another problem is the presence of sulphur as an impurity. A third difficulty, which is possibly important, is the presence of nitrogen as an impurity.

Great difficulty has also occurred in the prior art in cold working cobalt. This is believed to be due in large part to the hexagonal epsilon crystalline structure which is present at lower temperatures including room temperature.

As a result of an extensive research program, the present inventor has been able to produce cobalt or alloys high in cobalt which are both readily hot workable and readily cold workable and can result in the production of ductile sheet, strip, wire and other wrought products.

The elimination of contamination with oxygen, sulphur and nitrogen in accordance with the invention is believed to be responsible for the great improvement in hot workability.

The production of an austenitic or face centered cubic structure stable at room temperature in accordance with the present invention is believed to be largely responsible for the improvement in cold working of the hot worked product.

In accordance with the invention the granular cobalt raw material above referred to is remelted and alloyed as a first step. The remelting and alloying are accomplished under a protective environment, which may be either an inert gas such as argon, helium, zenon or krypton, or the protective environment may be a vacuum, or a slag covering.

In FIGURE 1 I illustrate an induction furnace consisting of a crucible 20, having a chamber 21 containing a charge 22, consisting of any suitable refractory material such as magnesia. The crucible is surrounded by a suitably water cooled inductor 23 which is led out through a gas tight envelope 24 by insulating bushings 25. The envelope comprises a suitable bottom 26 and a suitable top 27 connected together by a gasketed seal 28. Where a vacuum is to be applied the vacuum pump may be connected to connection 30 and connection 30' closed by valve $30^2$, and a low pressure suitably a few millimeters of mercury may be attained. Where a protective gas such as argon is being used, valve $30^2$ will be opened at connection 30' to introduce the gas and the gas will be withdrawn at connection 30.

The charge consisting of the cobalt and the alloying elements as later described is simply placed in the chamber 21 and the envelope closed, the structure evacuated and either a vacuum maintained or the structure is filled with a protective gas and then the inductor is turned on to melt the charge. The charge may suitably be allowed to solidify in the crucible to form an ingot, or if desired any of the well known techniques for pouring into a mold within the protective envelope may be used.

FIGURE 2 illustrates a Joule effect melting procedure for producing an ingot according to the invention. An electrode 31 suitably formed of a mixture of cobalt and the alloying ingredients by powder metal techniques, or by casting the cobalt and adding the other ingredients in the fusion zone as well known, is advanced as by feed rollers 32 through a contact making device 33 connected to one side of the electric circuit at 34. The other side of the electric circuit at 35 is connected to a continuous cobalt alloy casting 36 which is being progressively withdrawn from the zone at which Joule effect from the current passing through molten slag at 37 melts the electrode to form pool 38. The pool is continuously solidified by withdrawing heat through cooling collar 40 provided with cooling water connections 41 and 42 and having an internal separating partition 43. The flux 44 after melting forms a slag and deposits at 45 around the outside of the ingot, being removed as scale during the hot working operations later described.

It has been found experimentally that the ingot produced in the crucible of FIGURE 1 is frequently piped and can be cropped prior to hot working, and the ingot produced by continuous casting in FIGURE 2 can be used directly for hot working.

An important aspect of the invention is the melting with the cobalt and alloying with from 2 to 10% of iron preferably about 5% of iron. Experimental results show that quite satisfactory products for example can be obtained with iron contents of 4, 6 or 8%. These products unlike commercial cobalt, have an austenitic or face centered cubic structure at room temperature and are capable of cold working and show high ductility.

Another very desirable ingredient in the processing, which should preferably also be present in the alloying as a residual of from 0 to 3% preferably 0.5 to 3% and most desirably about 2%, is manganese. The manganese contributes to improving hot working by forming manganese sulphide which tends to agglomerate and separate as slag from the ingot. The manganese also promotes the formation of the austenitic or face centered cubic structure and therefore is desirable.

The manganese in addition functions as a deoxidizer and as a getter for nitrogen. Any suitable form of manganese may be used, suitably electrolytic manganese.

Another ingredient which is very desirable and will be employed where possible is magnesium. Magnesium functions to remove oxygen, to remove sulphur and to react with nitrogen. The magnesium will perform these functions even if no appreciable magnesium residual remains after the magnesium is introduced into the melt, and therefore the magnesium content may be 0 to 0.1% in the ingot, but for best results the magnesium content should be 0.01 to 0.1%, the magnesium not being increased beyond this point for fear of embrittlement.

Titanium may optionally be included as a treating agent and desirably as a residual alloying material. Titanium functions as a deoxidizer. Titanium may be present in the range from 0 to 0.8% and most desirably 0.05 to 0.8%. One rule which appears to be satisfactory is that one-half of the magnesium can be replaced by titanium, although actually the titanium content may be considerably higher than the permissible content of magnesium.

Nickel will often be present in the cobalt, and nickel may to advantage be added, as it has a favorable effect on cold working. The nickel content may be 0 to 12% and preferably 0.5 to 8%, the most desirable nickel content being about 2%.

A practical rule is that iron can be replaced by nickel if you use four times as much nickel as iron. Similarly iron can be replaced by manganese if you use four times as much manganese as iron. In other words, for a given weight of nickel or of manganese alloyed with cobalt, the favorable effect on the ductility of cobalt is the same as if a weight of iron had been used. Stated otherwise, when nickel or manganese is used as an alloying element with cobalt, the nickel or manganese are the equivalents of one-fourth their weight of iron. Thus in the case where iron is the sole alloying element with cobalt, its proportion should be between 2 and 10%. In case one uses in addition to iron, nickel and/or manganese as an alloying element with cobalt, the sum of the percentage of iron, one-fourth of the percentage of nickel and one-fourth of the percentage of manganese should equal between 2 and 10%. This sum is designated by the term "iron equivalent" and is indicated by the designation (Fe). Thus this can be written $$(Fe) = Fe + \frac{Ni}{4} + \frac{Mn}{4} \text{ and } 2\% < (Fe) < 10\%$$

In the wrough high cobalt alloy the carbon content should be as low as possible, certainly below 0.1% and for best results below 0.06%.

The high cobalt alloy may if desired contain small amounts of chromium, molybdenum and tungsten or one or some of these.

After the ingot has been produced, it may be hot rolled or otherwise hot worked. A suitable hot working technique is to soak the ingot for several hours at 1200° C. and then hot roll or otherwise hot work until the temperature reaches 900° C., resoaking as often as required. Annealing during hot working can be accomplished at 750° C.

It has been found that hot working can be accomplished in air without embrittlement using normal hot working techniques applied to steel. The passes should be suitably light, starting with a reduction of say 40% and ending with a reduction on the last pass of say 15%.

The hot worked billet, sheet or other material has a thin hard tenacious scale which is like a nickel scale, and this should be removed before cold working, for example by sand blasting or pickling.

The cold working can be accomplished at room temperature, annealing after from 2 or 3 passes suitably at 680° C. for 4 to 5 hours. Cold working can be accomplished in the atmosphere. The annealing should be done in a controlled atmosphere furnace using for example argon or one of the other inert gases mentioned. The cold rolled sheet can be suitably sheared into strip and the strip should then be annealed.

The cobalt sheet or strip is bright, capable of undergoing a considerable amount of forming, generally ductile, and resistant to corrosion. It is of high utility wherever a high cobalt material is desired and particularly for forming welding rods and electrodes. The iron content particularly and to some extent the manganese and nickel, contribute to maintaining the material in the austenitic form and preventing the transformation to the hexagonal epsilon phase.

The cobalt strip has a tensile strength of about 50 kilograms per square millimeter. It has an elongation typical of ductile steel.

The high cobalt alloy strip has been used successfully for producing tubular wire for welding electrodes or rods in which the cobat alloy forms the envelope and suitable powder metals are included in the core. It will be evident of course that flux can also be included in the core if desired.

FIGURE 3 illustrates an electrode or rod 46 having a high cobalt alloy strip envelope 47 which includes internally extending fin portions 48 and having a core 50.

FIGURE 4 illustrates a simpler form in which the envelope 47' is free from fins and the seam is at the outside at 51 instead of being internal as in FIGURE 3.

Successful results were obtained using a strip for the envelope which was initially 40 millimeters wide and 0.5 millimeter thick. The strip in many of the experiments was about 60% of the overall weight of the electrode. After reduction by rolling the welding wire had its diameter reduced from 6.5 millimeters to about 1/16 inch by cold drawing and the final welding wire remained ductile.

Using the welding wire as described it is possible to employ submerged arc automatic welding techniques and also gas shielded automatic welding techniques using shielding gases such as argon, helium and the other inert gases or using carbon dioxide, to apply hard facings of the character that include a cobalt base with tungsten and chromium and suitably a high carbon content. The hard facing can also be applied by gas welding techniques using the wire of the present invention as a rod. These hard facings are hot hard and resistant to oxidation.

The percentages referred to throughout the present application are percentages by weight.

The following examples illustrate the production of welding wires from a high cobalt strip which has a composition of 5% iron, 2.5% manganese, 0.1% magnesium, 0.1% carbon and balance cobalt. The strip was employed in the various examples using various proportions of strip and core and various ingredients of the core as follows:

*Example 1*

In this example the welding electrode consists of 64% by weight of the cobalt base strip just referred to, and 36% by weight of powdered core ingredients. The strip contributes the following ingredients to the overall composition of the electrode:

| | Percent |
|---|---|
| Iron | 3.2 |
| Manganese | 1.6 |
| Magnesium | 0.064 |
| Carbon | 0.064 |
| Cobalt | 59.07 |

The core powder consists of the following ingredients in percentages by weight:

| | Percent by weight |
|---|---|
| High carbon chromium composed of 90% chromium and 10% carbon | 60 |
| Graphite | 2.2 |
| Tungsten | 31.8 |
| Chromium | 6 |

These compounds of the core contribute the following ingredients of the electrode in percentages by weight:

| | Percent |
|---|---|
| Chromium from the high carbon chromium | 19.4 |
| Carbon from the high carbon chromium | 2.16 |
| Carbon from the graphite | 0.79 |
| Tungsten | 11.45 |
| Chromium from the chromium powder | 2.16 |

The total composition of the electrode in percentage by weight is as follows:

| | Percent |
|---|---|
| Iron | 3.2 |
| Manganese | 1.6 |
| Magnesium | 0.064 |
| Carbon | 3.014 |
| Cobalt | 59.07 |
| Chromium | 21.56 |
| Tungsten | 11.45 |
| Total | 99.958 |

*Example 2*

In this case 65% of the high cobalt strip as referred to above was used with 35% by weight of powdered material in the core.

The high cobalt strip contributed the following ingredients to the overall composition of the electrode in percentages by weight:

| | Percent |
|---|---|
| Iron | 3.25 |
| Manganese | 1.62 |
| Magnesium | 0.065 |
| Carbon | 0.065 |
| Cobalt | 59.995 |

The core consisted of the following powdered ingredients in percentages by weight:

| | Percent |
|---|---|
| High carbon chromium containing 90% chorium and 10% carbon by weight | 35 |
| Chromium | 50 |
| Tungsten | 15 |

The core contributes to the overall composition of the electrode the following percentages by weight:

| | Percent |
|---|---|
| Chromium from the high carbon chromium | 11.025 |
| Carbon from the high carbon chromium | 1.225 |
| Chromium from the chromium powder | 17.50 |
| Tungsten | 5.25 |

This results in a total composition of the electrode in percentages by weight as follows:

| | Percent |
|---|---|
| Iron | 3.25 |
| Manganese | 1.62 |
| Magnesium | 0.065 |
| Carbon | 1.290 |
| Cobalt | 59.995 |
| Tungsten | 5.25 |
| Chromium | 28.525 |
| Total | 99.995 |

*Example 2A*

Example 2A uses the same perecentage of the same strip as in Example 2. The composition of the powder in the core differs and the core has the following composition by weight:

| | Percent |
|---|---|
| Graphite | 3.0 |
| Tungsten | 15 |
| Chromium | 82 |

These contribute to the overall composition the following percentages by weight:

| | Percent |
|---|---|
| Graphite | 1.02 |
| Tungsten | 5.25 |
| Chromium | 28.70 |

The total composition of the electrode then is as follows:

| | Percent |
|---|---|
| Iron | 3.25 |
| Manganese | 1.62 |
| Magnesium | 0.065 |
| Carbon | 1.085 |
| Cobalt | 59.995 |
| Tungsten | 5.25 |
| Chromium | 28.70 |
| Total | 99.965 |

*Example 3*

In Example 3, 64% of the same high cobalt strip was used contributing the following ingredients to the electrode in percentages by weight:

| | Percent |
|---|---|
| Iron | 3.2 |
| Manganese | 1.6 |
| Magnesium | 0.064 |
| Carbon | 0.064 |
| Cobalt | 59.07 |

The core consisted of the following powders in percentages by weight:

| | Percent |
|---|---|
| Graphite | 3.6 |
| Tungsten | 21.4 |
| Chrominum | 75 |

The core contributed the following percentages by weight to the overall composition of the electrode:

| | Percent |
|---|---|
| Graphite | 1.296 |
| Tungsten | 7.704 |
| Chromium | 27.00 |

The total composition of the electrode in percentages by weight then is:

| | Percent |
|---|---|
| Iron | 3.2 |
| Manganese | 1.6 |
| Magnesium | 0.064 |
| Carbon | 1.36 |
| Cobalt | 59.07 |
| Tungsten | 7.704 |
| Chromium | 27.00 |
| Total | 99.998 |

*Example 4*

Using the same high cobalt strip above referred to making up 57.5% of the electrode, the strip contributes the following ingredients to the electrode in percentages by weight:

| | Percent |
|---|---|
| Iron | 2.875 |
| Manganese | 1.437 |
| Magnesium | 0.057 |
| Cobalt | 53.072 |
| Carbon | 0.057 |

The core which makes up 42.5% by weight of the electrode contains the following ingredients in percentages by weight:

| | Percent |
|---|---|
| Graphite | 7.5 |
| Chromium | 61 |
| Tungsten | 31.5 |

The core contributes the following ingredients to the electrode in percentages by weight:

| | Percent |
|---|---|
| Graphite | 3.187 |
| Chromium | 25.925 |
| Tungsten | 13.387 |

The total composition of the electrode in percentages by weight then is:

| | Percent |
|---|---|
| Iron | 2.875 |
| Manganese | 1.437 |
| Magnesium | 0.057 |
| Carbon | 3.244 |
| Cobalt | 53.072 |
| Chromium | 25.925 |
| Tungsten | 13.387 |
| Total | 99.997 |

All of the above electrode compositions are capable of being applied under submerged arc and under gas shielded arc welding techniques both manually and automatically to make hard facings which are of desirable properties and correspond generally in compositions to those heretofore obtained from cast high cobalt electrodes. They may also be used as cores of coated electrodes which will be applied by the well known manual arc welding technique.

In view of my invention and disclosure, variations and modifications to meet individual whim or particular need will doubtless become evident to others skilled in the art, to obtain all or part of the benefits of my invention without copying the product shown, and I, therefore, claim all such insofar as they fall within the reasonable spirit and scope of my claims.

Having thus described my invention what I claim as new and desire to secure by Letters Patent is:

1. A welding rod capable of being coiled, comprising a ductile cobalt base alloy envelope essentially composed of metal of the group consisting of iron, manganese and nickel and said metal of the group being in amount in conformity with the following formula:

$$\%Fe + \frac{\%Mn}{4} + \frac{\%Ni}{4} = 2\% \text{ to } 10\%$$

wherein iron permissibly is 2% to 10%, manganese permissibility is 0% to 3% and nickel permissibility is 0% to 12%, and the remainder of the alloy being substantially all cobalt, and the welding rod further comprising a powder core consisting essentially of refractory metal and carbon.

2. A welding rod of claim 1, in which the envelope has as an alloying ingredient between 0.5 and 3% of manganese.

3. A welding rod of claim 1, in which said envelope has as an alloying ingredient between 0.01 and 0.1 percent of magnesium.

4. A welding rod of claim 1, in which said envelope has as an alloying ingredient between 0.5 and 3 percent of manganese and between 0.01 and 0.1 percent of magnesium.

5. A welding rod of claim 1, in which said envelope has as alloying ingredients between 0.5 and 3 percent of manganese, between 0.01 and 0.1 percent of magnesium, and between 0.5 and 12 percent of nickel, with a maximum carbon content of 0.1 percent.

6. A welding rod of claim 1, in which said envelope has a carbon content not exceeding about 0.1% carbon.

7. A welding rod of claim 1, in which said envelope has a carbon content not exceeding about 0.1% carbon, and said core consists essentially of chromium and tungsten and enough carbon for the rod to produce a deposit having a carbon content in excess of about 1% carbon.

References Cited by the Examiner

UNITED STATES PATENTS 2,137,471  11/38  Zublin _____ 219—145
3,023,130  2/62   Wasserman et al. _____ 117—205 X
3,033,977  5/62   Quaas _____ 219—146

FOREIGN PATENTS 513,045  12/37  Great Britain.

RICHARD M. WOOD, *Primary Examiner.*